S. R. GIDDINGS & D. T. BLEVINS.
BEET TOPPER.
APPLICATION FILED APR. 22, 1907.
909,395.
Patented Jan. 12, 1909.
4 SHEETS—SHEET 1.
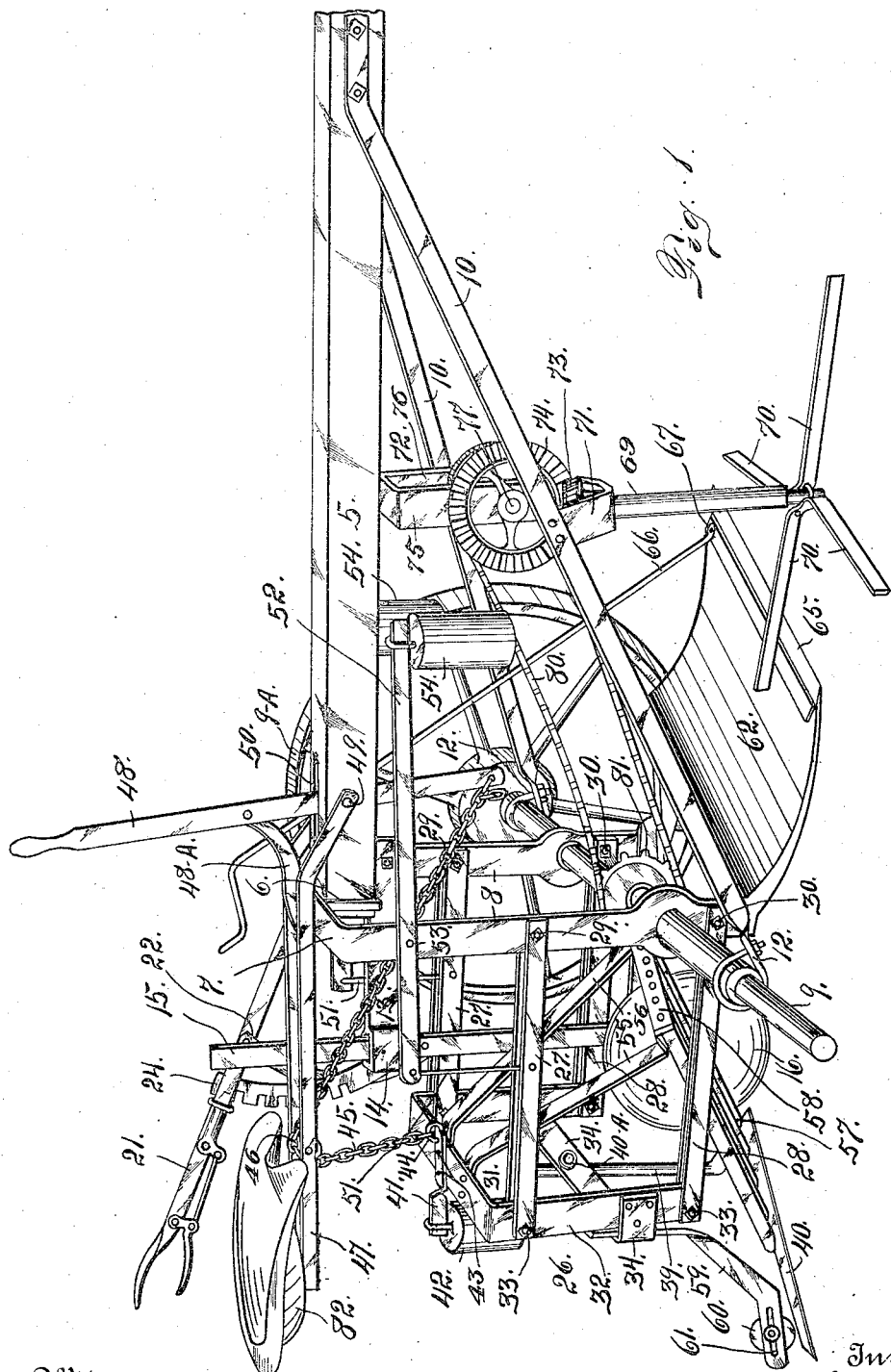
Witnesses
Otto E. Hoddick.
Dena Nelson.
Inventors
S. R. Giddings.
D. T. Blevins.
By H. R. Owen
Attorney

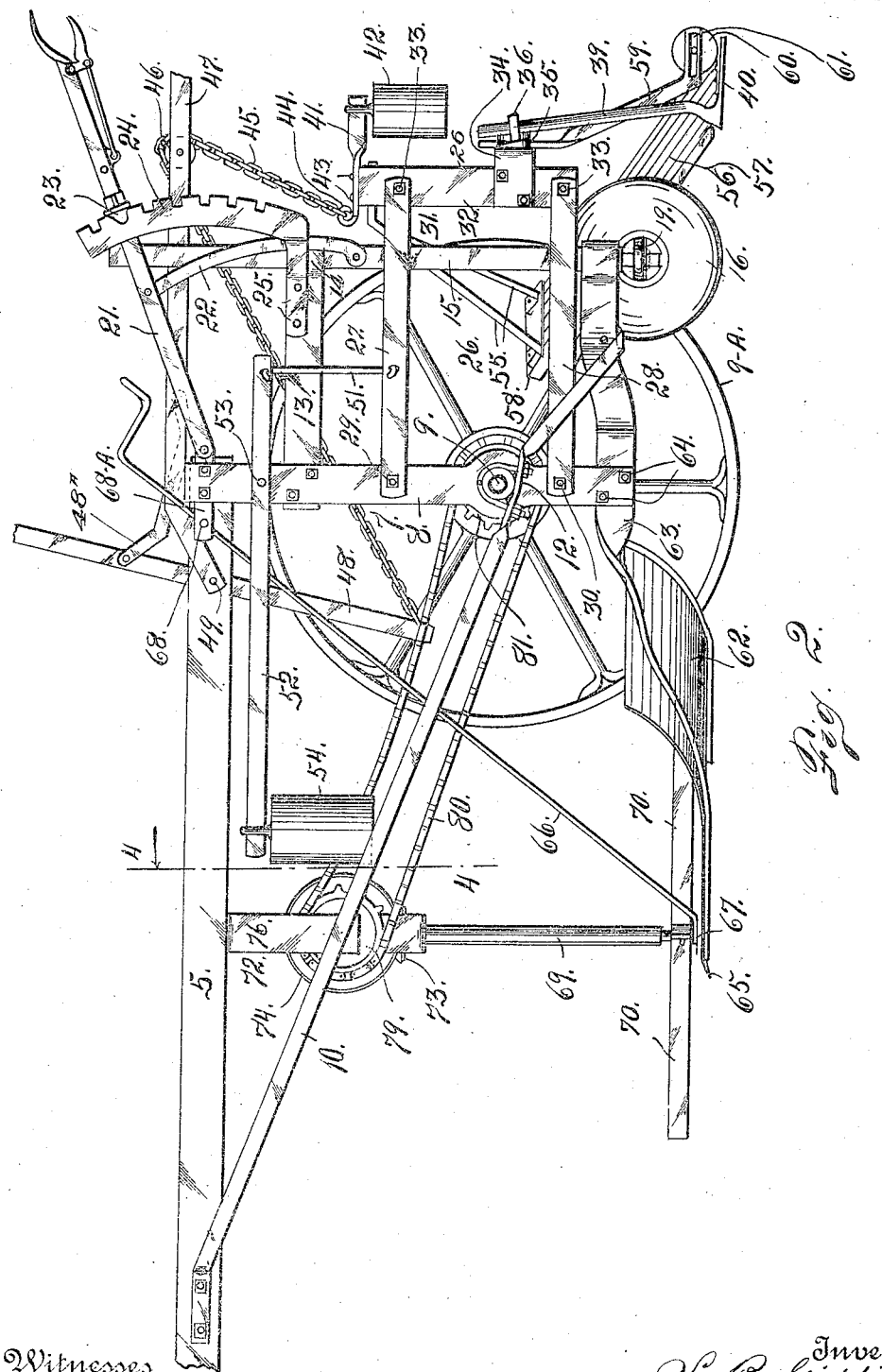

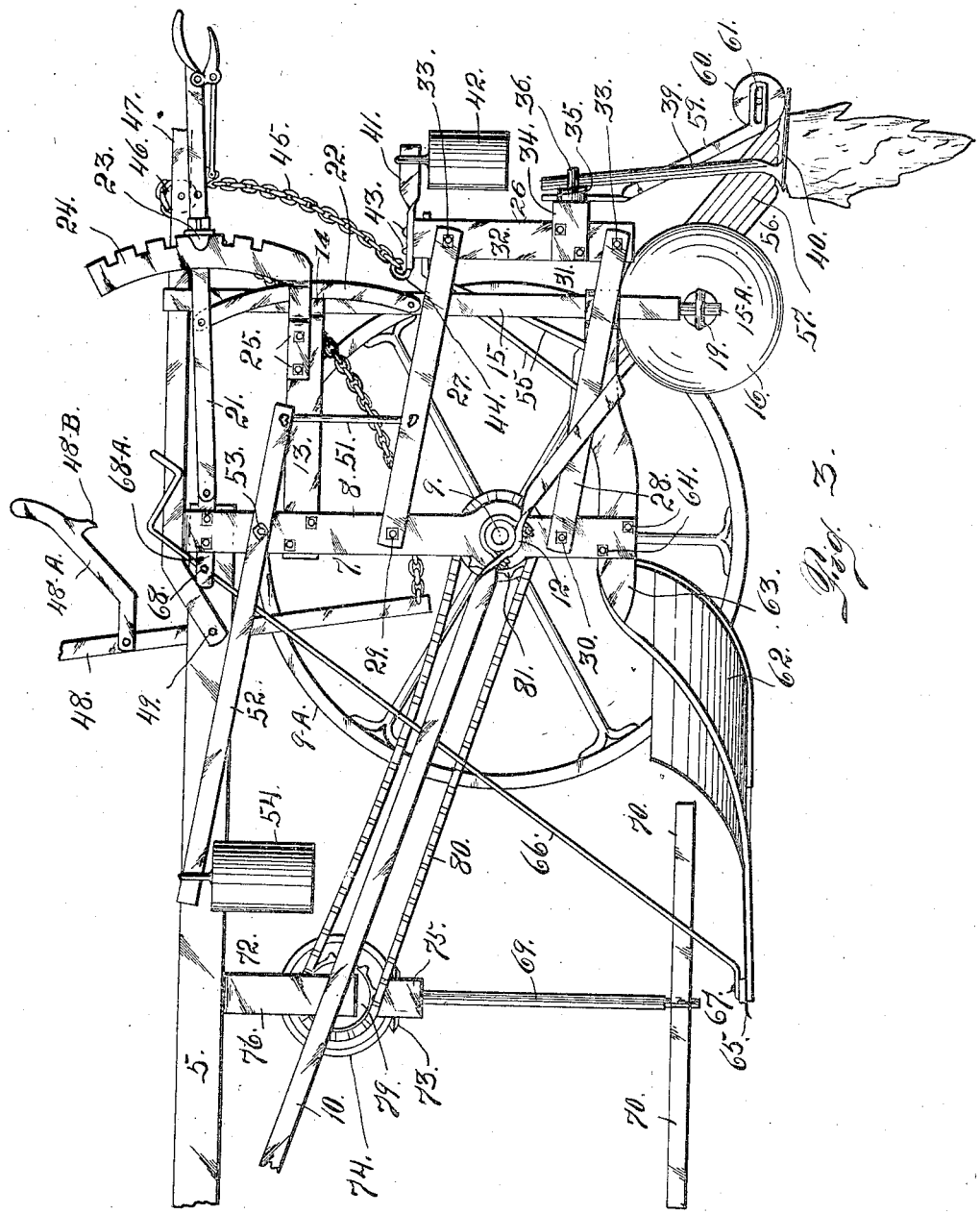

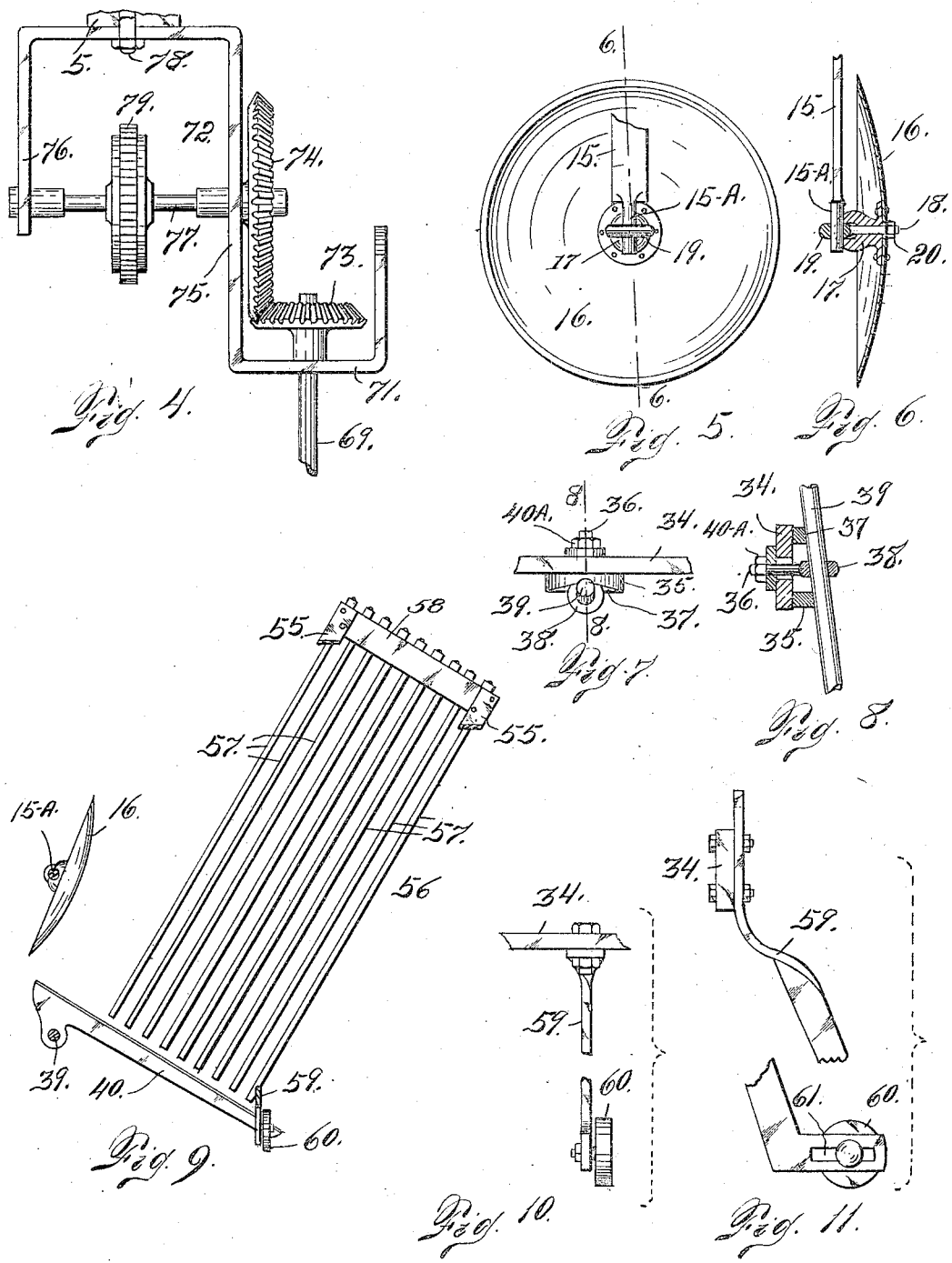

# UNITED STATES PATENT OFFICE.

SQUIRE RALPH GIDDINGS, OF TIMNATH, AND DAVID T. BLEVINS, OF WINDSOR, COLORADO, ASSIGNORS TO THE YANKEE BEET TOPPER COMPANY.

BEET-TOPPER.

No. 909,395.   Specification of Letters Patent.   Patented Jan. 12, 1909.

Application filed April 22, 1907. Serial No. 369,702.

*To all whom it may concern:*

Be it known that we, SQUIRE RALPH GIDDINGS and DAVID T. BLEVINS, both citizens of the United States, the said SQUIRE RALPH GIDDINGS residing at Timnath, in the county of Larimer, State of Colorado, and the said DAVID T. BLEVINS residing at Windsor, in the county of Weld and State of Colorado, have invented certain new and useful Improvements in Beet-Toppers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in beet toppers, our object being to provide a thoroughly practicable machine for properly performing the topping function of beets or other similar vegetables having tops to be removed.

The invention will now be described in detail reference being made to the accompanying drawing in which is illustrated an embodiment thereof.

In this drawing, Figure 1 is a perspective view of our improved machine with one of the ground wheels removed in order to better illustrate the mechanism. Fig. 2 is a side elevation of the machine showing the beet topping mechanism raised above the topping plane. Fig. 3 is a similar view showing the beet topping mechanism lowered to the topping position. Fig. 4 is a section taken on the line 4—4 Fig. 2 viewed in the direction of the arrow. Fig. 5 is a side elevation in detail of the rotary guide, plow or disk. Fig. 6 is a sectional view of the same taken on the line 6—6 Fig. 5. The disk supporting arm, however, being shown in elevation. Fig. 7 is a top view in detail of the beveled washer for adjusting the position of the topping knife. Fig. 8 is a section taken on the line 8—8 Fig. 7, the knife bar being shown in elevation. Fig. 9 is a top view in detail of the gage, the cutter knife and the guide disk or plow shown in their proper relative positions. Fig. 10 is a rear detail view of a roller arranged above the topping knife and coöperating therewith during the performance of the beet topping function, the roller supporting arm being partly broken away. Fig. 11 is a side view of the same.

The same reference characters indicate the same parts in all the views.

Let the numeral 5 designate the top frame bar of the machine which is centrally located and connected at its rear extremity as shown at 6 with a depending U-shaped frame 7 whose parallel arms 8, form the support for the axle 9 which is journaled in the said arms. Upon the extremities of this axle are made fast ground wheels $9^A$ which form the support for the machine. The frame work is further provided with braces 10 connected with the forward portion of the beam 5 on opposite sides, the said braces extending downwardly and outwardly from the said bar, their lower extremities being connected with the axle by means of clips 12 in which the axle is free to rotate.

Secured to one of the arms 8 of the U-shaped member and extending rearwardly therefrom is a guide 13 composed of a bar whose rear extremity 14 is provided with an opening through which passes a vertically disposed arm 15 to whose lower portion is attached a rotary concavo convex disk 16 provided with a central hub 17 journaled on a spindle 18 having an eye 19 at one extremity through which passes the lower end of the bar 15. This disk is adjustable on the bar by loosening a nut 20 threaded on the extremity of the spindle and engaging the convex surface of the disk. The lower end of the said bar is cylindrical in shape as shown at $15^A$, whereby it is adapted to fit the opening in the eye 19. This construction permits the adjustment of the disk by turning the eye upon the supporting bar, thus causing the disk to stand at any desired angle to the travel of the machine. The bar 15 together with the disk may be raised and lowered by means of a lever 21 connected with the bar by a link 22. This lever is provided with a pawl or dog 23 adapted to engage notches formed in a quadrant 24 connected with the guide 13 as shown at 25.

Pivotally connected with the arms 8 of the frame, is a vertically swinging frame 26 composed of upper parallel bars 27 and lower parallel bars 28. Each of the bars 27 as shown in the drawing is formed double. The forward extremities of the bars 27 are pivotally connected with the bars 8 above the axle as shown at 29; while the corresponding extremities of the bars 28 are pivotally connected with the bars 8 below the axle as shown at 30. The rear extremities of the bars 27 and 28 are pivotally connected with the depending parallel arms 32 of an inverted U-shaped frame 31, the points of connection being shown at 33. The U-shaped frame 31 is provided with a transverse bar 34 to which is secured a washer 35 by means of an eye-bolt 36. The rear face of this washer is beveled as shown at 37. Through the eye 38 of this bolt, passes the arm 39 which supports the topping knife 40. This knife-supporting arm is connected with the bar 34 by means of the eye-bolt, a nut 40^A being applied to the threaded extremity of the bolt to clamp the arm 39 in place. By means of this construction it is evident that the topping knife may be raised and lowered at will or adjusted vertically as may be desired. If it is desired to regulate the inclination of the arm 39, the position of the washer 35 may be changed and by virtue of its beveled or inclined face, it is evident that the aforesaid adjustment may be effected.

The rear extremity of the swinging frame 31 is provided with a rearwardly extending arm 41 upon which is slidably mounted a weight 42. This arm 41 is connected with the top of the U-shaped frame as shown at 43 and is also provided with a forwardly located eye 44 with which is connected one extremity of a chain 45 which passes over a guide pulley 46 mounted on a stationary part 47 of the frame. This chain also passes downwardly and forwardly from the pulley 46, its lower and forward extremity being connected with the lower end of the lever 48 fulcrumed on the frame as shown at 49. This lever passes through a slotted opening 50 formed in the beam 5.

To each of the arms 27, is attached an upwardly projecting rod 51 to whose upper extremity is connected the rear end of a lever 52 fulcrumed on an arm 8 as shown at 53. To the forward extremity of each arm 52 is slidably connected a weight 54. The two weights 54 may be termed counterbalance weights. They are freely adjustable on the levers 52, and by means of them, any desired counterbalance result with reference to the swinging frame may be obtained.

Connected with the upper part of the U-shaped frame 31 is a pair of forwardly and downwardly extending arms 55 whose lower and forward extremities are connected with the upper extremity of a gage 56 which is downwardly and rearwardly inclined, its lower extremity occupying a position just forward of the topping knife 40. This knife occupies a position inclined to the forward travel of the machine in order to produce a shearing cut when in operation. This gage 56 is composed of a series of parallel fingers 57 whose upper extremities are connected with a transverse bar 58. These fingers 57 are of equal length, but the gage occupies a position extending obliquely to the travel of the machine, whereby the lower extremities of the fingers terminate in a line parallel with the cutting edge of the knife and slightly in the rear of the said edge. The function of this gage, is to pass over the top of the beet or other vegetable to be topped, whereby the swinging frame together with the topping knife, may be raised and lowered according to the elevation of the beet or its projection above the surface of the ground.

Connected with the transverse bar 34 of the U-shaped frame 31, is a depending arm 59 in whose lower extremity is journaled a roller 60, the journal of the roller passing through the slot 61 for purposes of adjustment. This roller 60 occupies a position slightly above the topping knife 40, and its function is to bear upon the knife whenever there is a tendency to spring the latter upwardly by virtue of the resilience of the material. In this way the roller prevents the upward springing of the knife whereby the latter might be thrown out of operative position.

Suitably connected with the frame work of the machine forward of the axle, is a sort of metal apron 62, the same being supported by means of a rigid arm 63 made fast to one of the frame bars 8 by means of bolts 64. This apron occupies a position considerably forward of the topper knife and is itself provided with a cutting edge 65. This apron is further supported by a rod 66 connected with the apron at its lower extremity as shown at 67, while its upper extremity is connected with a lug 68^A by a set bolt 68. When the rod is adjusted to give the proper elevation to the forward extremity of the apron or platform 62, it is locked in this position by means of a set bolt 68. The lug 68^A is bifurcated and forms a guide and support for the upper part of the rod.

Forward of the apron 62 is located a vertically disposed rotary shaft 69 provided at its lower extremities with radially projecting wings 70 whose function is to act on the foliage of the vegetables, and sweep them against the edge 65 of the apron whereby they are severed, thrown upon the apron and subsequently swept to one side by the rotation of the radial wings. This device is more especially intended for use with vegetables where the foliage is luxuriant and projects a considerable distance above the ground, whereby it would interfere with the operation of the mechanism. By virtue of the construction just described, this surplus or excessive foliage is removed in advance of the topper mechanism and gotten out of the way, thus obviating the possible clogging of parts of the machine.

The shaft 69 is journaled in a part 71 of a Z-shaped frame 72 suitably mounted upon the frame work of the machine. The upper extremity of the shaft 69 is provided with a bevel gear 73 meshing with a gear 74 fast on a shaft 77 journaled in two vertically disposed members 75 and 76 of the Z-shaped frame. This frame is connected with the central frame bar 5 by means of a bolt 78. Centrally mounted upon the shaft 77 is a sprocket wheel 79 from which leads a chain 80, to a sprocket 81 fast on the axle 9 of the machine.

Suitably supported upon the frame work of the machine and extending rearwardly from the bar 5 and practically in alinement therewith, is the part 47 which is double or composed of two members, its rear extremity forming a support for a seat 82 for the driver during the operation of the machine.

From the foregoing description the use and operation of our improved construction will be readily understood. The machine when in use is drawn across the field by a team, the ground wheels of the machine straddling the row of beets or other vegetables to be topped. When the foliage of the beets is of such a nature as to require it, the rotary shaft 69, the rotary wings 70 together with the apron or platform 62 and its cutting edge 65 are utilized whereby a considerable portion of the foliage is cut off, thrown upon the platform and swept off by the radial wings to one side, that is to say out of the path of the topping knife. As the machine proceeds, the lower extremity of the gage engages the portions of the vegetables which project above the surface of the ground and regulate the cutting plane of the knife. If a beet projects considerably from the ground, the gage acting on the vertically swinging frame, will raise the latter together with the knife 40 and cause the knife to cut the top of the beet in a proper plane. If the next beet is lower, the gage descends and also cuts the neck of the lower beet in the proper plane. By having the knife as well as the gage of considerable transverse width, all of the vegetables of the row may be topped even though some of the individual specimens are considerably out of alinement. The function of the rotary disk 16, is by its engagement with the ground, to form a guide for the machine whereby the latter is prevented from undue lateral movement. This device also performs the function of cutting away a portion of the foliage of the vegetables on one side. This function is especially valuable where the foliage of the vegetables is so close to the ground that the radial wings 70 together with the apron or platform 62 and its cutter, cannot reach them. It often happens that late in the season the foliage of beets and other vegetables occupies a position very close to the surface of the ground. In this event it would be impracticable to use the foliage-clearing mechanism composed of the parts 62, 65, 69 and 70, in which event as heretofore stated the cutting disk would clear away a portion of the foliage and leave the way clear for the forward extremity of the cutting edge of the knife to act upon the top. This cutter is vertically adjustable by means of a lever 21 and when forced downwardly into the operative position (see Fig. 3), it performs the function heretofore explained. When the machine is in use, it is evident that the vertically swinging frame carrying the topping knife and the gage, are lowered to the position shown in Fig. 3, by the proper adjustment of the lever 48. The weights 42 and 54, serve to steady the mechanism, and by their adjustment the proper vertical tension or downward pressure due to gravity, may be regulated and controlled. When the machine is not in use the vertically swinging frame carrying the topping knife and gage are raised to the position shown in Fig. 2 by the lever 48 and held in this position by the gravity pawl 48$^A$ its tooth 48$^B$ engaging the end of the bar 5.

Having thus described our invention, what we claim is:

1. In a vegetable topping machine, the combination with a relatively stationary frame work, of a vertically oscillating frame mounted thereon, a topping knife carried by the frame, a gage also mounted on the oscillating frame and being rearwardly and downwardly inclined from its forward extremity, the said gage occupying a position oblique to the travel of the machine, and its rear extremity being parallel with the topping knife which is inclined to the direction of the machine's travel to produce a shearing cut and a roller normally occupying a position just above the knife and adapted to engage the latter in case of a tendency to spring the knife unduly upwardly, substantially as described.

2. The combination with a relatively stationary frame work, of a vertically oscillating frame mounted thereon, a topping knife carried by the last named frame, a depending arm also mounted on the frame, its lower extremity being provided with a roller normally occupying a position just above the knife and adapted to engage the latter, in case of a tendency to spring the knife unduly upwardly, substantially as described.

3. In a machine of the class described, the combination with a main frame work, of a vertically oscillating frame mounted thereon, a vertically adjustable arm mounted on the oscillating frame, a topping knife connected with the lower extremity of the arm, a washer having a beveled face, the said washer being mounted on the frame in engagement with the knife-supporting arm, whereby by the adjustment of the washer the position of the arm may be regulated, substantially as described.

4. The combination with a relatively stationary frame, of a vertically oscillating frame mounted thereon, a knife supported by said frame, the position of the knife forming an angle to the direction of travel for the purpose of giving a shearing cut, a vertically adjustable rotary disk mounted on the stationary frame adapted to enter the ground, and a gage composed of a series of fingers, the gage being mounted on the oscillating frame, its upper extremity being highest, and its position being such that it is downwardly and rearwardly inclined from its forward extremity and also occupies a position oblique to the length of the direction of travel, whereby its lower extremity is parallel with the direction of the knife.

5. The combination with a relatively stationary frame, of a vertically oscillating frame mounted thereon, a topping knife, and a gage carried thereby, means for adjustably suspending the oscillating frame whereby its vertical position may be regulated at will and a vertically adjustable rotary disk mounted on the frame for the purpose set forth.

6. The combination with a stationary frame, of a vertically oscillating frame mounted thereon, topping devices carried by said frame, means for adjustably suspending the oscillating frame, and counterbalance weights connected with the frame and extending both forwardly and rearwardly from a vertical plane and passing through the centers of oscillation, substantially as described.

7. The combination with a relatively stationary frame, of a vertically oscillating frame, a beet topping device carried by the last named frame, and a vertically adjustable rotary disk mounted on the stationary frame and adapted to enter the ground during the performance of the beet topping function, for the purpose set forth.

8. In a machine of the class described, the combination with a relatively stationary frame, of a vertically adjustable auxiliary frame mounted thereon, a topping knife carried by said frame, a rotary disk, a vertically adjustable bar upon which said disk is mounted, the disk being connected with the bar to permit rotary adjustment on an axis at right angles to the axis of the disk whereby the position of the axis of the disk with reference to the direction of travel may be regulated at will.

9. The combination with a relatively stationary frame, of an auxiliary frame movably mounted thereon, beet topping devices carried by the frame, a vertical adjustable bar mounted on said stationary frame, a rotary guide disk mounted on the bar and means connected with the bar for regulating its vertical position, said means comprising a lever, a connection between the lever and the bar, and a quadrant coöperating with the lever whereby the bar may be thrust downward and the rotary disk maintained in position to penetrate the earth to a predetermined depth, substantially as described.

In testimony whereof we affix our signatures in presence of two witnesses.

SQUIRE RALPH GIDDINGS.
DAVID T. BLEVINS.

Witnesses:
C. B. BREWER,
E. W. THAYER.